J. FEDDERSON.
COMBINATION HOG TROUGH.
APPLICATION FILED MAY 9, 1918.
1,275,144.
Patented Aug. 6, 1918.
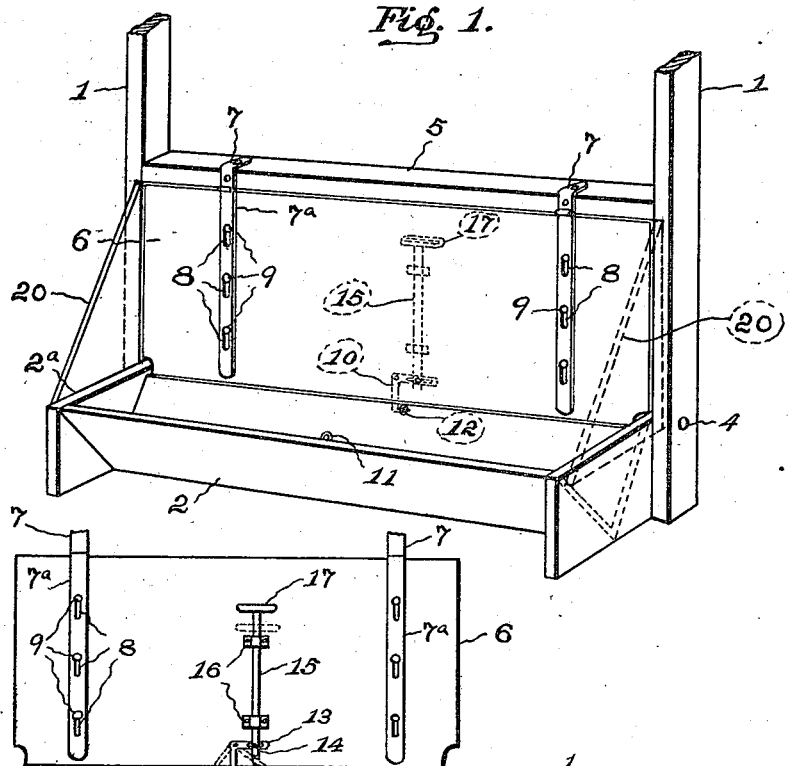
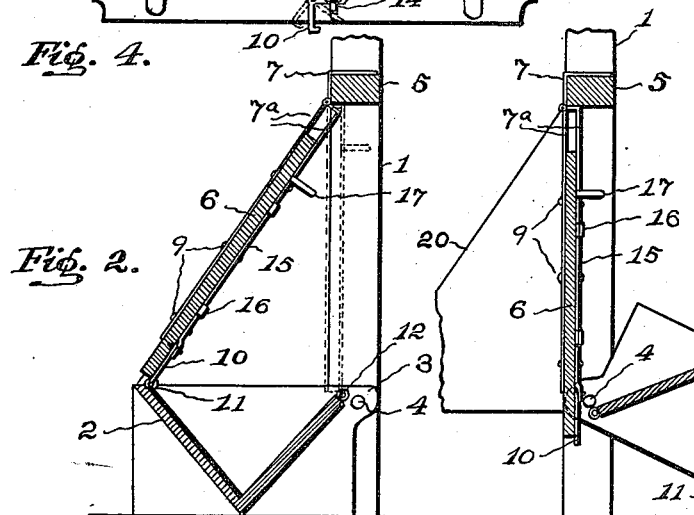
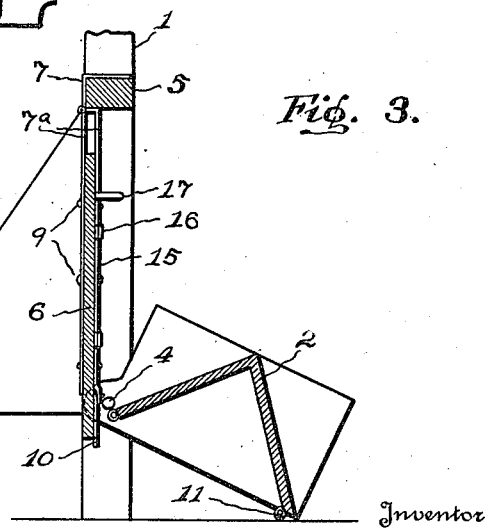
Inventor
J. Fedderson
By H. S. Hie
Attorney

UNITED STATES PATENT OFFICE.

JAMES FEDDERSON, OF BERESFORD, SOUTH DAKOTA.

COMBINATION HOG-TROUGH.

1,275,144.  Specification of Letters Patent.  Patented Aug. 6, 1918.

Application filed May 9, 1918. Serial No. 233,528.

*To all whom it may concern:*

Be it known that I, JAMES FEDDERSON, a citizen of the United States, residing at Beresford, in the county of Union, State of South Dakota, have invented a new and useful Combination Hog-Trough; and I do hereby declare the following to be a full, clear, and exact description of the invention, such as will enable others skilled in the art to which it appertains to make and use the same.

The present invention relates to a trough for feeding hogs or like animals, and has for its object to provide a device of this character which embodies novel features of construction whereby the hogs can be excluded from the trough while filling the same, and which prevents the hogs from wasting the feed over the back of the trough.

Further objects of the invention are to provide a hog trough of this character which is comparatively simple and inexpensive in its construction, which can be used to equal advantage in hog houses or in connection with open pens, which can be easily and quickly adjusted in the desired manner, and which admits of the trough being easily and thoroughly cleaned.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a perspective view of a hog trough constructed in accordance with the invention, showing the swinging gate in normal position.

Fig. 2 is a transverse sectional view through the hog trough, the swinging gate being shown as swung inwardly and secured to the inner edge of the trough in such a manner as to prevent the hogs from obtaining access to the trough while filling the same.

Fig. 3 is a similar view with the trough swung rearwardly into an inverted position.

Fig. 4 is a detached view of the swinging gate and latch means thereon.

Corresponding and like parts are referred to in the following description and indicated in all the views of the drawings by the same reference characters.

Referring to the drawings, which illustrate one embodiment of the invention, the numerals 1 designate a pair of spaced standards, and 2 a trough which is arranged between the lower ends of the standards, the ends pieces $2^a$ of the trough being provided at the back or rear edge of the trough with ears or extension 3 which are pivotally connected at 4 to the standards, thereby enabling the trough to be swung rearwardly into an inverted position, as indicated by Fig. 3, when desired. The standards 1 are connected by a cross bar 5 which is arranged at a suitable elevation above the trough, and a swinging gate 6 is hingedly suspended from this cross bar. This gate is of such a size as to fill the space between the cross bar and top of the trough when the gate hangs in a vertical position, as indicated by Fig. 1. When the gate is in this position it prevents the hogs from wasting feed over the back of the trough. The upper edge of the gate 6 is connected to the cross bar 5 by hinges 7, the portions of the hinges which engage the gate being shown as formed with spaced sides or straps $7^a$ which straddle the gate and extend substantially the full width thereof. These straps may be slotted, as indicated at 8, to receive fastening members 9 which extend through the gate. The gate thus has a limited sliding movement upon the hinges, and this enables it to be moved forwardly so that the hook or latch member 10 at the swinging edge of the gate can be readily brought into engagement with a keeper 11 at the front of the trough when the gate is swung inwardly, as indicated by Fig. 2, When the gate is in this position the hogs are excluded from the trough and the trough can be easily filled with feed without difficulty or annoyance. After the trough has been filled with feed the swinging gate 6 is moved back into a vertical position, as indicated by Fig. 1, and the hook member 10 caused to engage a keeper 12 at the back or rear edge of the trough. This hook member 10 is shown as provided with a lateral arm 13 which has a pin and slot connection 14 with the lower end of an operating slide 15, said slide being mounted within guide keepers 16 and being provided at its upper end with a handle 17. This construction admits of the hook member being easily manipulated without any unnecessary stooping or bending. When it is desired to clean the trough the gate 6 is swung inwardly a sufficient amount to admit of the trough being swung rearwardly into an inverted position, as indicated by Fig. 3. When in this position the trough can be easily and thoroughly cleaned without difficulty or interference on the part of the hogs. If thought necessary guards 20 may be applied to the standards 1 at the ends of the trough and arranged to keep the hogs or live stock from getting into the trough at the ends thereof when the gate is swung inwardly.

Having thus described the invention, what I claim as new and desire to secure by Letters Patent, is:—

1. The combination of a pair of spaced standard, a cross bar connecting the standards, a trough arranged between the lower ends of the standards, a swinging gate suspended from the cross bar, hinge members connecting the upper edge of the swinging gate to the cross bar and adjustably connected to the gate to admit of the latter having a limited sliding movement up and down thereon, keepers at the front and rear of the trough, and a latch member on the swinging edge of the gate adapted to be brought into engagement with either of the keepers.

2. The combination of a pair of spaced standards, a cross bar connecting the standards, a trough arranged between the lower ends of the standards, a swinging gate, hinges connecting the upper edge of the swinging gate to the cross bar, said hinges having a pin and slot connection with the gate which admits of the gate having a limited sliding movement thereon, and latch means for connecting the swinging edge of the gate to either the front or rear side of the trough.

3. The combination of a pair of spaced standards, a cross bar connecting the standards, a trough arranged between the lower ends of the standards, a swinging gate suspended from the cross bar, hinge members connecting the upper edge of the swinging gate to the cross bar and loosely connected to the gate to admit of the latter having a limited sliding movement thereon, keepers at the front and rear of the trough, a latch member on the swinging edge of the gate for engagement with either keeper, and a slide mounted upon the gate and having an operative connection with the latch member.

4. The combination of a pair of spaced standards, a cross bar connecting the standards, a trough arranged between the lower ends of the standards, the back of the trough being pivotally connected to the standards so that it can be swung rearwardly into an inverted position, a swinging gate suspended from the cross bar, hinges connecting the uprights of the gate to the cross bar, the gate having a limited sliding movement upon the hinges, keepers applied to the front and rear of the trough, and latch means upon the swinging end of the gate for engaging either of the keepers when the trough is in an upright position, the gate serving to exclude hogs from the trough when it is swung rearwardly into an inverted position.

In testimony whereof I have signed my name to this specification in the presence of two subscribing witnesses.

JAMES FEDDERSON.

Witnesses:
 EDW. M. LINDE,
 J. A. LARSON.

Copies of this patent may be obtained for five cents each, by addressing the "Commissioner of Patents, Washington, D. C."